United States Patent
Belpaire et al.

(10) Patent No.: US 10,737,732 B2
(45) Date of Patent: Aug. 11, 2020

(54) SYSTEM OF A REINFORCED STRUCTURAL ELEMENT OF A MOTOR VEHICLE

(71) Applicant: SIKA TECHNOLOGY AG, Baar (CH)

(72) Inventors: Vincent Belpaire, Uccle (BE); Ardi Shehu, Rotselaar (BE)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 16/192,082

(22) Filed: Nov. 15, 2018

(65) Prior Publication Data
US 2019/0144047 A1   May 16, 2019

(30) Foreign Application Priority Data

Nov. 15, 2017 (EP) ..................... 17201944

(51) Int. Cl.
| | |
|---|---|
| B62D 27/02 | (2006.01) |
| B62D 25/04 | (2006.01) |
| B62D 25/02 | (2006.01) |
| B62D 29/00 | (2006.01) |
| B62D 25/00 | (2006.01) |

(52) U.S. Cl.
CPC ........... *B62D 27/026* (2013.01); *B62D 25/00* (2013.01); *B62D 25/025* (2013.01); *B62D 25/04* (2013.01); *B62D 29/002* (2013.01); *B62D 29/005* (2013.01)

(58) Field of Classification Search
CPC .... B62D 25/025; B62D 25/04; B62D 25/026; B62D 25/00; B62D 29/002; B62D 29/005
USPC ...... 296/187.02, 30, 193.06, 203.01, 203.03, 296/205
See application file for complete search history.

(56) References Cited

U.S. PATENT DOCUMENTS

| | | | |
|---|---|---|---|
| 5,915,781 A * | 6/1999 | DeRees | B29C 66/54 296/203.01 |
| 8,857,899 B2 * | 10/2014 | Matsuda | B62D 25/00 296/187.12 |
| 2002/0174954 A1 * | 11/2002 | Busseuil | B62D 25/00 156/349 |
| 2012/0119546 A1 * | 5/2012 | Honda | B62D 25/025 296/203.01 |

FOREIGN PATENT DOCUMENTS

| | | |
|---|---|---|
| DE | 102007025930 A1 | 12/2008 |
| DE | 102011117951 A1 | 5/2012 |

OTHER PUBLICATIONS

May 25, 2018 European Search Report issued in European Patent Application No. 17201944.0.

* cited by examiner

*Primary Examiner* — Joseph D. Pape
(74) *Attorney, Agent, or Firm* — Oliff PLC

(57) ABSTRACT

A system of a reinforced structural element of a motor vehicle includes a structural element having two panel sheets, as well as a reinforcing element, and an adhesive. The reinforcing element herein in the region of joints of the panel sheets is adhesively bonded to the structural element.

13 Claims, 5 Drawing Sheets

SYSTEM OF A REINFORCED STRUCTURAL ELEMENT OF A MOTOR VEHICLE

The invention relates to a system of a reinforced structural element. The invention relates in particular to a system of a reinforced structural element for a motor vehicle.

Construction elements such as, for example, bodies and/or chassis frames of transportation and conveyance means, in particular of aquatic or terrestrial vehicles or of aircraft, in many instances have structures having cavities in order for lightweight constructions to be enabled. These cavities however cause the most varied of problems. Depending on the type of the cavity, the latter has to be sealed in order to prevent the ingress of moisture and contaminations which can lead to corrosion of the construction elements. It is often also desirable for the cavities and thus the construction element to be substantially reinforced but for the low weight to be maintained. It is often also necessary for the cavities and thus the construction elements to be stabilized in order for noises which would otherwise be transmitted along the cavity or through the latter to be reduced. Many of these cavities have an irregular shape or tight dimensions, on account of which it becomes difficult to properly seal, reinforce, and insulate said cavities.

Sealing elements (baffles) are therefore used in particular in the automotive industry but also in the aviation and nautical industry in order for cavities to be sealed and/or to be acoustically closed off, or reinforcing elements (reinforcers) are used in order for cavities to be reinforced.

A body of an automobile is schematically illustrated in FIG. 1. The body 10 herein has various structures having cavities such as, for example, pillars 14 and supports or stays 12, respectively. Such structural elements 12, 14 having cavities are usually sealed or reinforced, respectively, using sealing and/or reinforcing elements 16.

A cross section through a structural element 12, 14 is schematically illustrated in FIG. 1b. It is often the case in such structural elements 12, 14, that a first panel sheet 4 and a second panel sheet 5 are joined together at joints 6, 7, wherein the panel sheets 4, 5 configure a cavity 3 between the joints 6, 7.

Known concepts of how such structural elements 12, 14 can be reinforced are illustrated in FIGS. 2a and 2b. In each case one system 1 of a reinforced structural element 12, 14 is thus illustrated in FIGS. 2a and 2b. In each case one reinforcing element 11 herein is disposed in the cavity of the structural element 12, 14. The reinforcing element 11 herein is connected to the structural element 12, 14, or to the panel sheets 4, 5, respectively, by way of an adhesive layer 13.

The reinforcing elements 11 usually have a cross section as illustrated in FIGS. 2a and 2b. Since the reinforcing elements 11 are often produced by the injection-moulding method, it is commonplace for the cross sections to be kept open, that is for the reinforcing elements to be able to be pulled off the injection mould. However, on account of said open shape of the cross sections of the reinforcing elements 11, compromises are necessary when mating the reinforcing element 11 to the panel sheets 4, 5. For example, it is thus not possible for the reinforcing element to be adhesively bonded to the structural element 12, 14 along the entire circumference of said reinforcing element.

This has a disadvantageous effect on the properties of the reinforced structural element. A best possible mating of the reinforcing element 11 to the structural element is desirable in particular in the case of heavy loads such as arise in crash-relevant components, for example.

The invention is therefore based on the object of providing an improved system of a reinforced structural element of a motor vehicle, said improved system permitting an improved mating of the reinforcing element to the structural element. Requirements such as arise in components having cases of particularly high loads are to be able to be better met in particular herein.

This object is achieved by a system of a reinforced structural element of a motor vehicle, wherein the system comprises: a structural element which comprises a first panel sheet and a second panel sheet, wherein the panel sheets are interconnected at a first joint and at a second joint, and wherein the panel sheets form an elongate cavity in the region between the first joint and the second joint; a reinforcing element which comprises a first side wall, a second side wall, and a connecting wall connecting the side walls, and which is disposed in the cavity of the structural element; and adhesive which adhesively bonds the reinforcing element to the structural element; wherein the first side wall of the reinforcing element is disposed in the region of the first joint, and the second side wall of the reinforcing element is disposed in the region of the second joint, such that the first side wall is adhesively bonded to the first panel sheet and to the second panel sheet, and such that the second side wall is likewise adhesively bonded to the first panel sheet and to the second panel sheet.

This solution offers the advantage that a markedly better reinforcement of the structural element is achievable on account of the adhesive bonding of the side walls to in each case the first panel sheet and the second panel sheet. On account thereof, not only are the adhesively bonded faces between the reinforcing element and the structural element enlarged, but in addition the panel sheets by way of the reinforcing element and the adhesive are indeed also mutually adhesively bonded. This substantially reinforces the entirety of the structural element.

It is a core concept of the present invention that in particular the regions of the joints between the panel sheets are to be reinforced by the reinforcing element, so as to be able to improve an overall property of the system in terms of a mechanical load-bearing capability.

The structural element is reinforced in an efficient manner by the reinforcing element in particular on account of the direct reinforcement of both joints.

In one exemplary embodiment the first side wall comprises a first part-wall and a second part-wall, wherein the second side wall likewise comprises a first part-wall and a second part-wall, and wherein the first part-wall of the first side wall and the first part-wall of the second side wall are adhesively bonded to the first panel sheet, and wherein the second part-wall of the first side wall and the second part-wall of the second side wall are adhesively bonded to the second panel sheet.

This solution has the advantage that, on account thereof, in each case one side wall is subdivided into a first part-wall and a second part-wall, wherein the part-walls are in each case adhesively bonded to different panel sheets. The provision of part-walls in the side walls is advantageous in particular in the case of cavities in which the panel sheets at the joint are not present in a continuous plane, so as to guarantee an as positive as possible mating of the reinforcing element in the region of the joints.

In one exemplary embodiment the first panel sheet across in each case at least 10 mm, measured from the first joint or from the second joint, respectively, and orthogonally to a longitudinal axis of the reinforcing element, is adhesively bonded to the first side wall and to the second side wall.

In one exemplary embodiment the second panel sheet across in each case at least 10 mm, measured from the first joint or from the second joint, respectively, and orthogonally to a longitudinal axis of the reinforcing element, is adhesively bonded to the first side wall and to the second side wall.

The provision of adhesive bondings across at least 10 mm has the advantage that comparatively large faces of the reinforcing element and of the structural element can be mutually adhesively bonded on account thereof. An improved reinforcement of the structural element by the reinforcing element can be achieved on account thereof.

In one exemplary refinement the adhesive bondings measure in each case at least 15 mm, at least 20 mm, or at least 25 mm.

In one exemplary embodiment the first side wall and the second side wall across in each case the entire width thereof, measured orthogonally to the longitudinal direction of the reinforcing element, are adhesively bonded to the first panel sheet and the second panel sheet.

This has the advantage that on account thereof a maximum adhesively bonded face of the side walls of the reinforcing element is utilized for connecting to the structural element.

In one exemplary embodiment the connecting wall comprises a first part-wall and a second part-wall, wherein the first part-wall and the second part-wall interconnect in each case the first side wall and the second side wall.

The provision of two connecting walls offers the advantage that improved mechanical properties of the reinforcing element per se can be achieved on account thereof. A further advantages lies in that, on account of the provision of two connecting walls, a larger surface of the reinforcing element is fundamentally provided, said surface being able to be adhesively bonded to the structural element.

In one exemplary embodiment the first part-wall of the connecting wall is at least in part adhesively bonded to the first panel sheet, and the second part-wall of the connecting wall is at least in part adhesively bonded to the second panel sheet.

The at least partial adhesive bonding of the connecting walls to the structural element offers the advantage that, on account thereof, a further improvement in the mating of the reinforcing element to the structural element can be achieved.

In one exemplary embodiment the connecting wall interconnects the first side wall and the second side wall in such a manner that the connecting wall is disposed so as to be substantially diagonal in the structural element.

The provision of such a diagonal connecting wall has the advantage that, on account thereof, the reinforcement element can be designed so as to be fundamentally lighter.

In one exemplary embodiment the connecting wall of the reinforcing element is at least in partially free of adhesive.

In one exemplary embodiment the adhesive on the first side wall is not connected to the adhesive on the second side wall.

In one exemplary embodiment, the reinforcing element is constructed at least partially from fibre-reinforced plastic, or from plastic, or from aluminium or from magnesium.

In one exemplary embodiment all walls of the reinforcing element are formed from the same material.

In one exemplary embodiment the adhesive has an expansion rate of less than 500%, or less than 400%, or less than 300%, or the adhesive is a non-expandable adhesive.

Materials which are expandable to a lesser degree, or non-expandable materials, offer the advantage that the adhesive, on account thereof, does not lose mechanical stability to an excessive degree on expansion. In principle, a material becomes weaker in mechanical terms the more the material is expanded.

SikaReinforcer®-940 or SikaPower®-497 in particular are examples of adhesives which are non-expandable or expandable to a lesser degree. SikaReinforcer®-940 herein is an example of an expandable material, whereas Sika-Power®-497 is an example of a non-expandable material.

The term "non-expandable" in the context of this invention means that a material varies the volume thereof by not more than or by less than 10% in the process steps envisaged for said material. For example, non-expandable adhesives can shrink to a minor degree when curing. Such a volumetric variation when curing is considered to be "non-expandable" in the context of this application.

In one exemplary embodiment the adhesive is curable at a temperature of more than 120°.

In one further alternative embodiment the system comprises a first adhesive and a second adhesive, wherein the adhesives have dissimilar properties, in particular in terms of expansion and/or curing and/or a mating capability and/or a mechanical load-bearing capacity.

In one exemplary embodiment, the adhesive is a tape adhesive, a shape memory adhesive, an injectable adhesive, an injection-moulded adhesive or an extruded adhesive.

In one exemplary embodiment, the adhesive has a layer thickness of 0.3 to 7 mm, or of 1 to 6 mm, or of 2 to 5 mm.

In one exemplary embodiment, the reinforcing element comprises ribs which are oriented so as to be substantially orthogonal to a longitudinal axis of the reinforcing element, and which interconnect the first side wall and the second side wall.

The provision of such ribs offers the advantage that, on account thereof, a mechanical load-bearing capability of the reinforcing element per se can be further improved.

In one exemplary embodiment the first side wall in the region of the first joint is adhesively bonded to the first panel sheet and to the second panel sheet by way of a continuous layer of adhesive.

In one exemplary embodiment the second side wall in the region of the second joint is adhesively bonded to the first panel sheet and to the second panel sheet by way of a continuous layer of adhesive.

The provision of a continuous adhesive layer in the region of the joints offers the advantage that, on account thereof, the critical region of the structural element at the joints can be reinforced in an ideal manner by way of the reinforcing element.

The reinforcing element can be produced by a three-dimensional printing method, for example.

Details and advantages of the invention are described in the following text on the basis of embodiment examples and with reference to schematic drawings, in which.

Figure 1A:
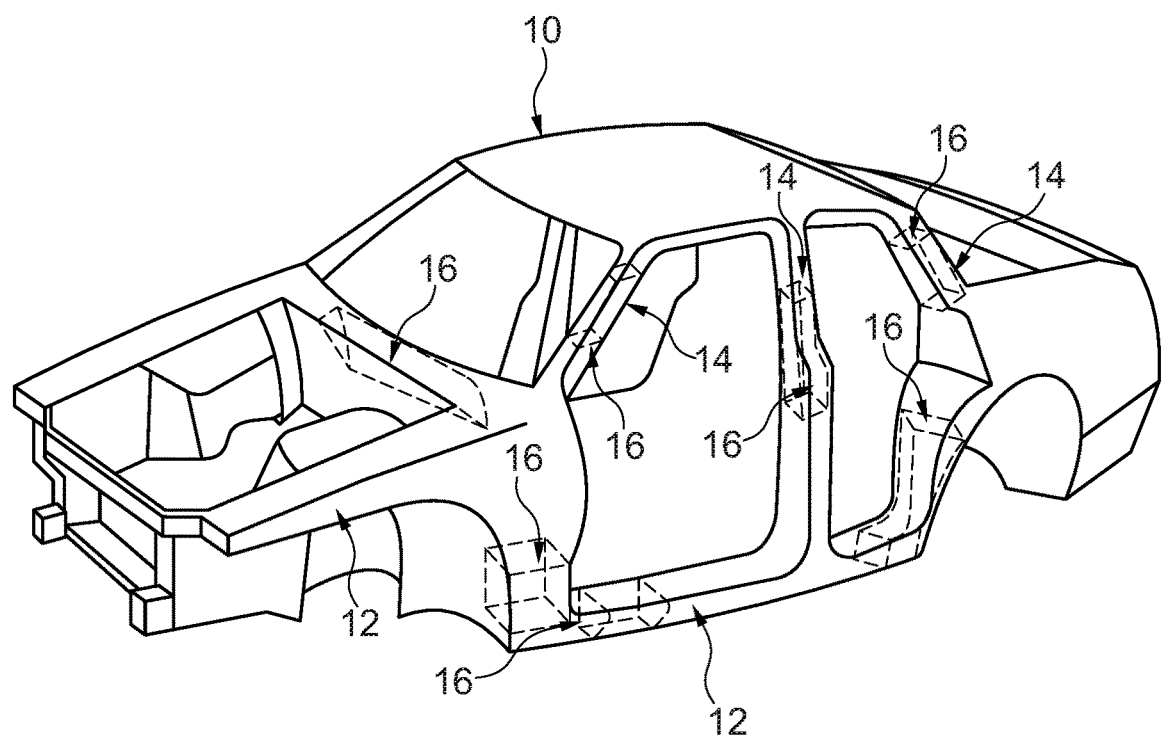
FIG. 1a shows an exemplary illustration of a body.
Figure 1B:
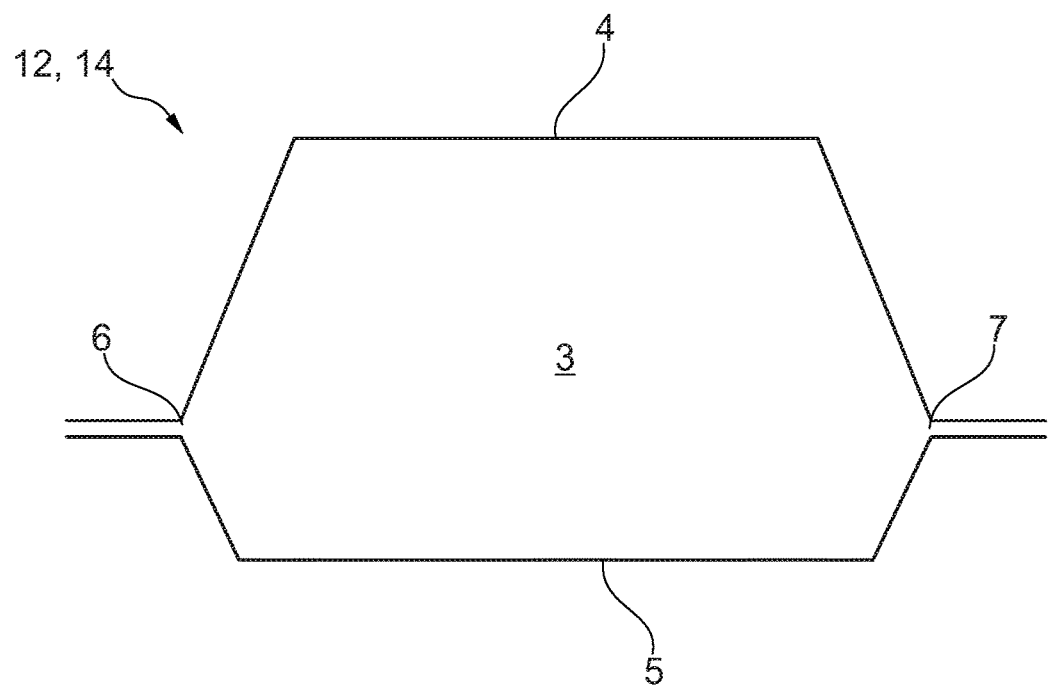
FIG. 1b shows a schematic illustration of a cross section through a structural element of the body.
Figure 2A:
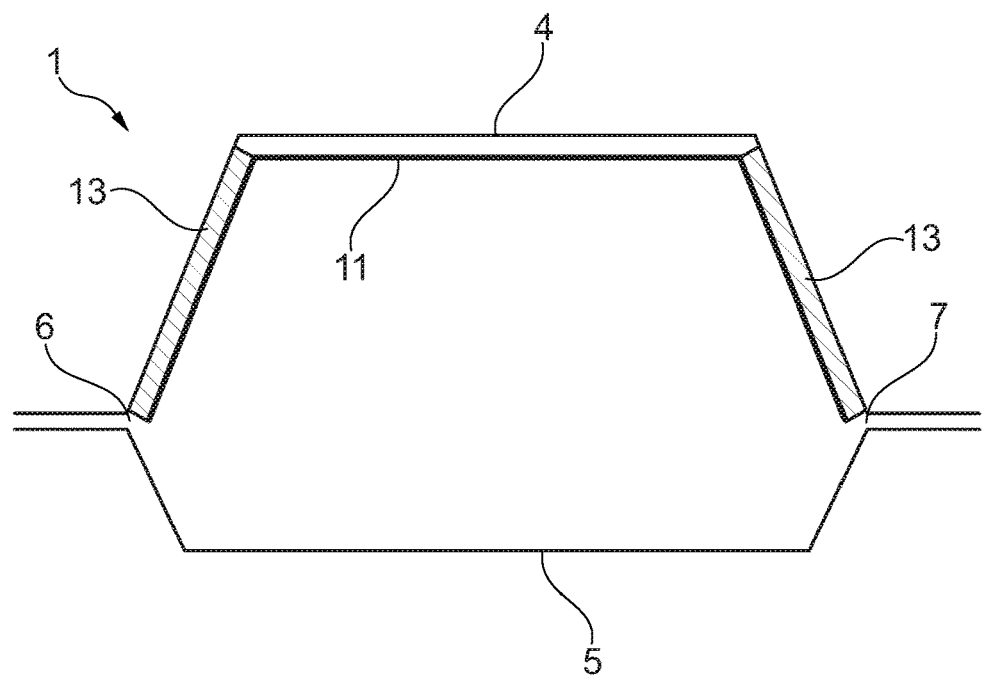
FIGS. 2a and 2b show a schematic illustration of a system of a reinforced structural element according to the prior art.
Figure 2B:
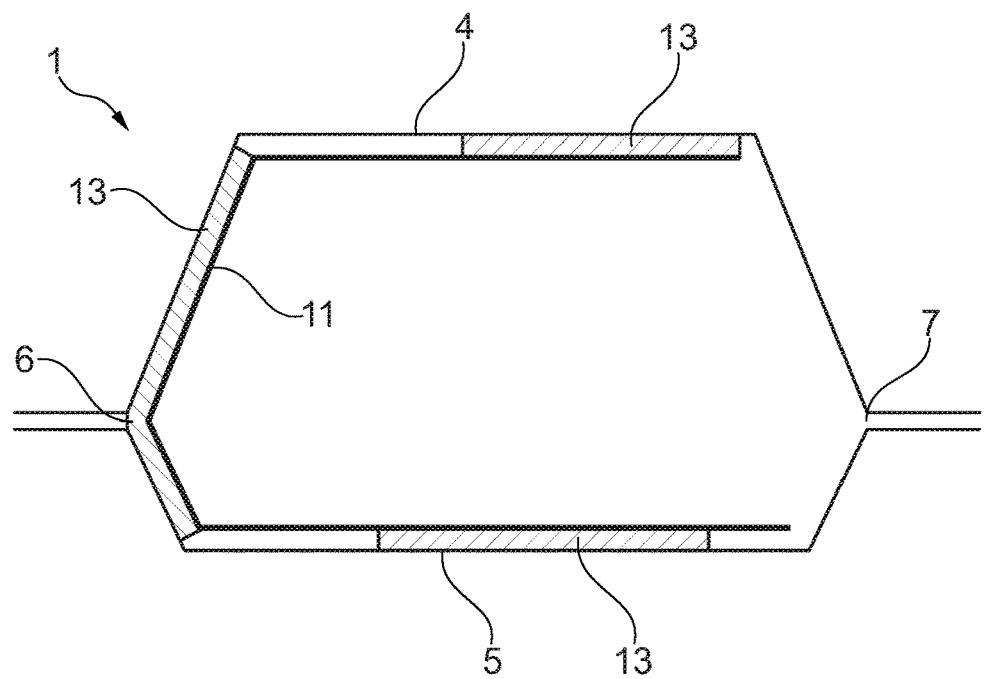
Figure 3A:
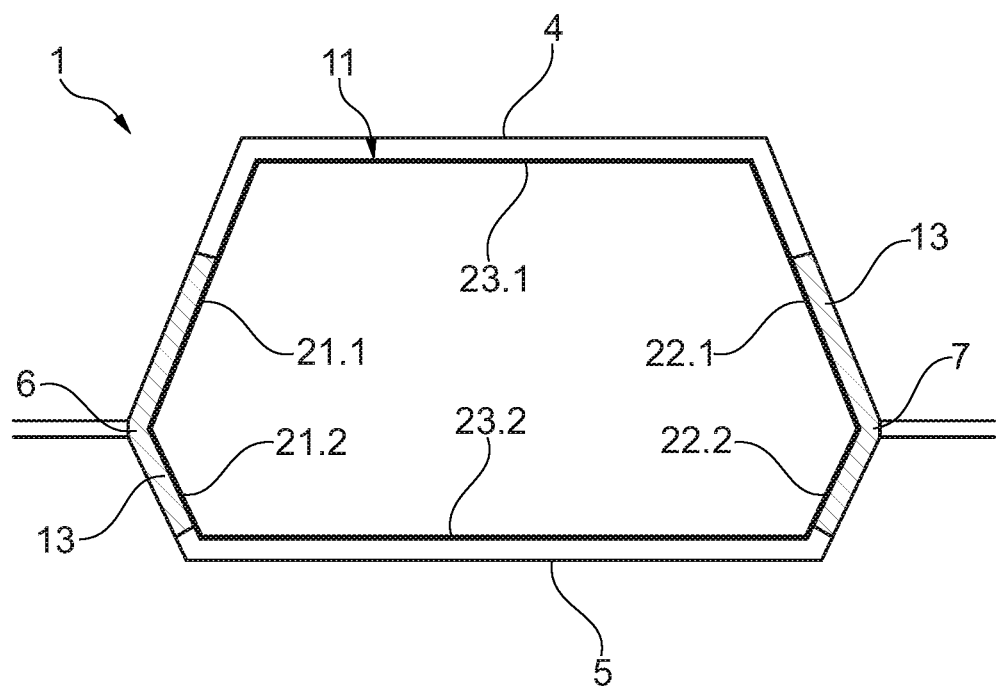
FIGS. 3a to 4b show a schematic illustration of an exemplary system of a reinforced structural element.
Figure 3B:
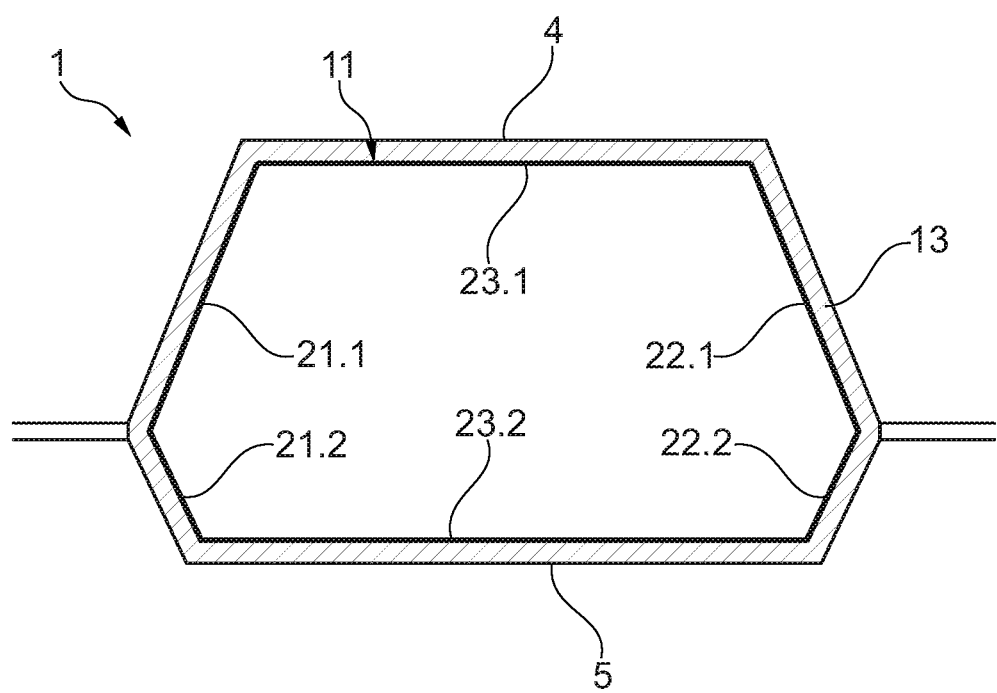
Figure 4A:
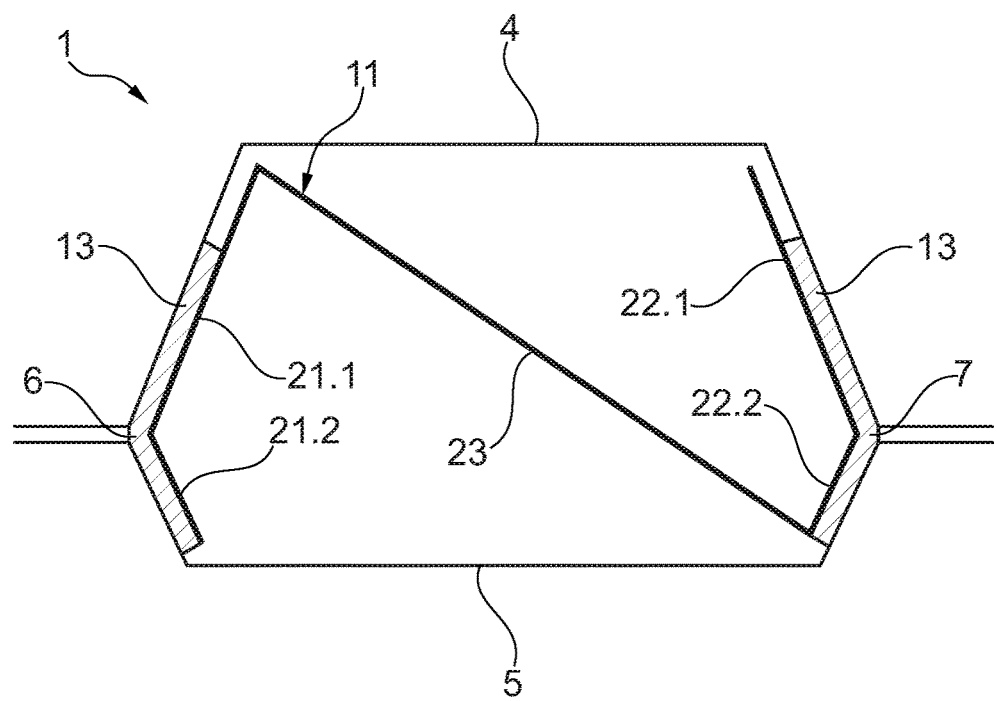
Figure 4B:
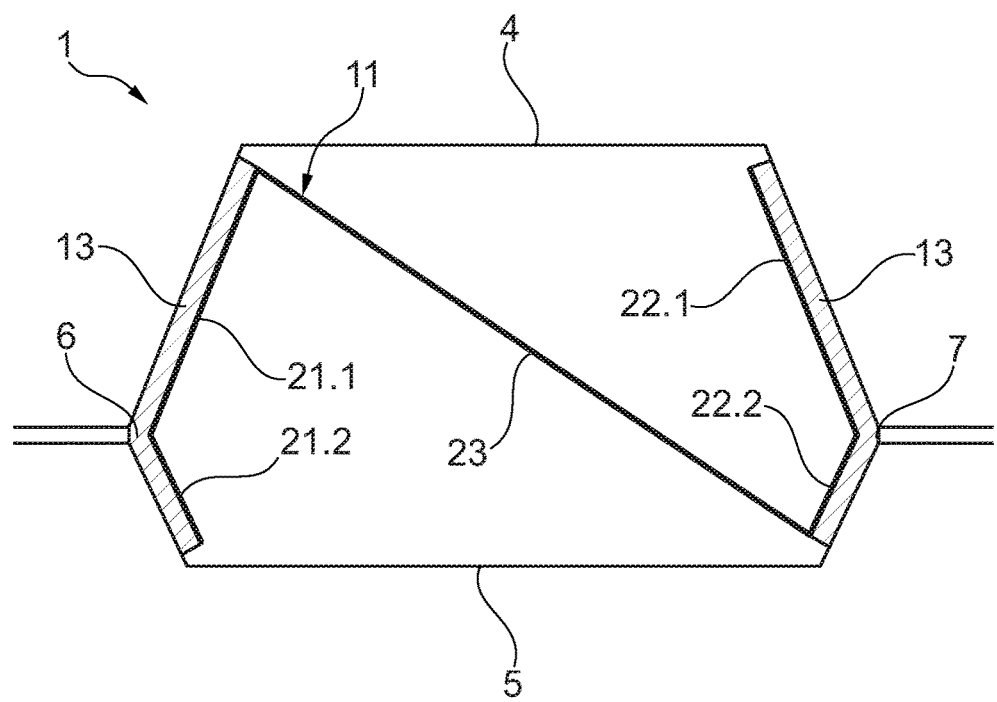

Various exemplary embodiments of a system 1 of a reinforced structural element 12, 14 are illustrated in FIGS. 3a to 4b. In each case one reinforcing element 11 having a first connecting wall 23.1 and having a second connecting wall 23.2 is illustrated herein in FIGS. 3a and 3b, and in each case one reinforcing element 11 having only one connecting wall 23 is illustrated in FIGS. 4a and 4b.

In the system 1 according to FIG. 3a the reinforcing element 11 has a first side wall 21 which is subdivided into a first part-wall 21.1 and a second part-wall 21.2. The second side wall 22 likewise has a first part-wall 22.1 and a second part-wall 22.2. The side walls 21, 22 now are adhesively bonded to the panel sheets 4, 5 of the structural element 12, 14 in such a manner that one side wall 21, 22 is in each case adhesively bonded to both panel sheets 4, 5. Adhesive 13 for the adhesive bonding of the reinforcing element 11 to the structural element 12, 14 is disposed in particular in the region of the joints 6, 7.

The reinforcing element 11 furthermore comprises a connecting wall 23 which is subdivided into a first part-wall 23.1 and into a second part-wall 23.2. Each part-wall 23.1, 23.2 herein is disposed in such a manner that said part-wall 23.1, 23.2 interconnects in each case the side walls 21, 22. The part-walls 23.1, 23.2 of the connecting wall 23 in this exemplary embodiment are not adhesively bonded to the structural element 12, 14.

The system 1 illustrated in FIG. 3b differs from the system according to FIG. 3a in that, besides the side walls 21, 22, the part-walls 23.1, 23.2 of the connecting wall 23 here are also adhesively bonded to the panel sheets 4, 5, using adhesive 13. The adhesive 13 in this exemplary embodiment is disposed completely about the reinforcing element 11 such that a maximum surface of the reinforcing element 11 is adhesively bonded to the panel sheets 4, 5 of the structural element 12, 14.

The reinforcing element 11 in FIGS. 4a and 4b, by contrast to the embodiments according to FIGS. 3a and 3b, has in each case only one connecting wall 23. This connecting wall 23 herein is disposed in such a manner that said connecting wall 23 lies so as to be substantially diagonal in the cavity of the structural element 12, 14. The connecting wall 23 herein is free of adhesive 13. In a manner analogous to that of the exemplary embodiments according to FIGS. 3a and 3b, the side walls 21, 22, the part-walls 21.1, 21.2, 22.1, 22.2 thereof, respectively, in the region of the first joint 6 and in the region of the second joint 7 are again adhesively bonded by way of adhesive 13 to the panel sheets 4, 5. The side walls 21, 22 in FIG. 4a herein are not completely covered with adhesive 13, wherein the side walls 21, 22 according to the exemplary embodiment in FIG. 4b are completely covered with adhesive 13 and adhesively bonded to the panel sheets 4, 5.

Figure 5:
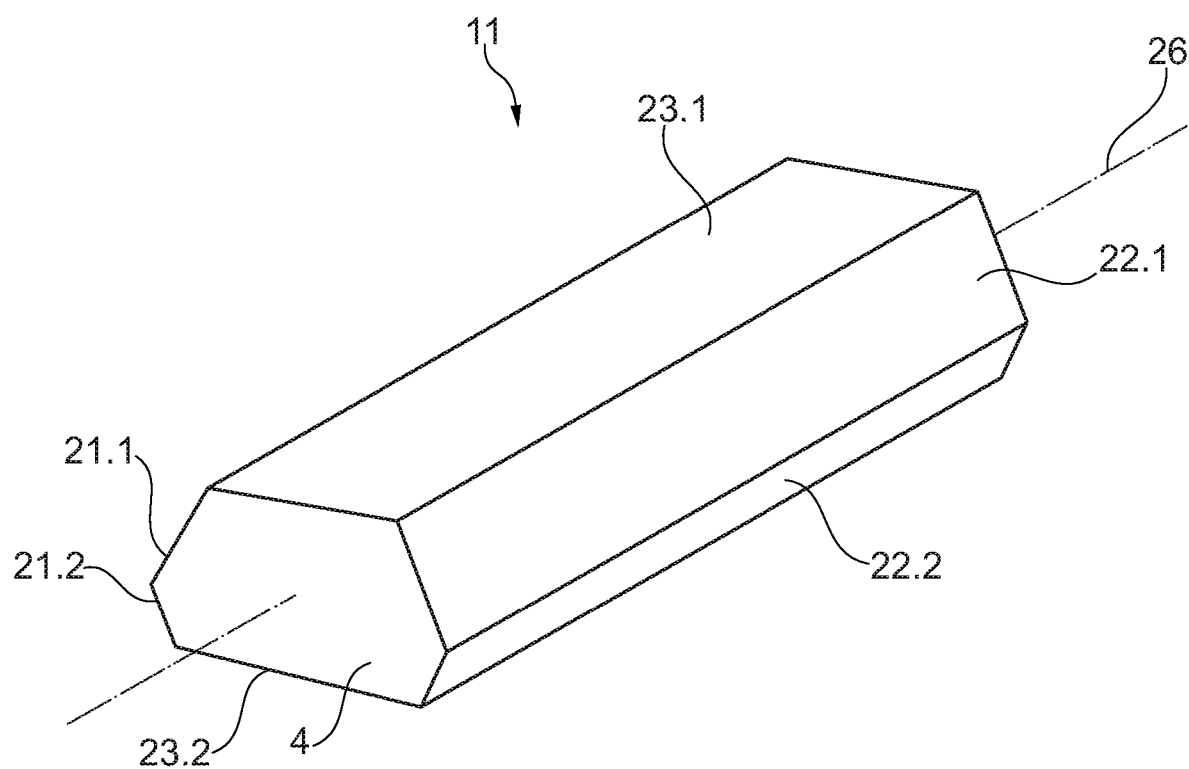
FIG. 5 shows a schematic illustration of an exemplary reinforcing element.

A reinforcing element 11 is illustrated in spatial illustration in FIG. 5. The reinforcing element 11 herein has a longitudinal axis 26, wherein the reinforcing element 11 is disposed in the structural element such that the longitudinal axis 26 is disposed so as to be parallel with the longitudinal direction of the cavity of the structural element 12, 14.

The reinforcing element 11 again has side walls 21, 22 and a connecting wall 23, wherein all walls 21, 22, 23 are in each case subdivided into part-walls. The reinforcing element 11 moreover has a front and rear wall 24.

LIST OF REFERENCE SIGNS

1 System
3 Cavity
4 First panel sheet
5 Second panel sheet
6 First joint
7 Second joint
10 Body
11 Reinforcing element
12 Structural element
13 Adhesive
14 Structural element
16 Device
21 First side wall
22 Second side wall
23 Connecting wall
24 Front/rear wall
26 Longitudinal axis

The invention claimed is:

1. A system of a reinforced structural element of a motor vehicle, the system comprising:
   a structural element which comprises a first panel sheet and a second panel sheet, wherein the panel sheets are interconnected at a first joint and at a second joint, and wherein the panel sheets form an elongate cavity in the region between the first joint and the second joint;
   a reinforcing element which comprises a first side wall, a second side wall, and a connecting wall connecting the side walls, and which is disposed in the cavity of the structural element; and
   an adhesive which adhesively bonds the reinforcing element to the structural element, wherein the adhesive is provided as a layer that is injection molded or extruded and has a thickness in the range of from 2 mm to 5 mm, and the adhesive is a non-expandable adhesive or an adhesive having an expansion rate of less than 500%;
   wherein the first side wall of the reinforcing element is disposed in a region of the first joint, and the second side wall of the reinforcing element is disposed in a region of the second joint, such that the first side wall is adhesively bonded to the first panel sheet and to the second panel sheet, and such that the second side wall is adhesively bonded to the first panel sheet and to the second panel sheet.

2. The system according to claim 1, wherein the first side wall comprises a first part-wall and a second part-wall, and wherein the second side wall comprises a first part-wall and a second part-wall, wherein the first part-wall of the first side wall and the first part-wall of the second side wall are adhesively bonded to the first panel sheet, and wherein the second part-wall of the first side wall and the second part-wall of the second side wall are adhesively bonded to the second panel sheet.

3. The system according to claim 1, wherein at least 10 mm of the first panel sheet along a cross-sectional view, which is orthogonal to a longitudinal axis of the reinforcing element that extends in a direction of elongation of the elongate cavity, is adhesively bonded to the first and second side walls; and
   wherein at least 10 mm of the second panel sheet along the cross-sectional view is adhesively bonded to the first and second side walls.

4. The system according to claim 3, wherein, from the cross-sectional view, (i) the entire first side wall is adhesively bonded to the first and second panel sheets; and (ii) the entire second side wall is adhesively bonded to the first and second panel sheets.

5. The system according to claim 1, wherein the connecting wall comprises a first part-wall and a second part-wall, wherein the first part-wall and the second part-wall interconnect in each case the first sidewall and the second side wall.

6. The system according to claim 5, wherein the first part-wall of the connecting wall is at least in part adhesively bonded to the first panel sheet, and wherein the second part-wall of the connecting wall is at least in part adhesively bonded to the second panel sheet.

7. The system according to claim 1, wherein the connecting wall interconnects the first side wall and the second side wall in such a manner that the connecting wall is disposed so as to be substantially diagonal in the structural element.

8. The system according to claim 1, wherein the connecting wall of the reinforcing element is at least partially free from adhesive and/or wherein the adhesive on the first side wall is not connected to the adhesive on the second side wall.

9. The system according to claim 1, wherein the reinforcing element is at least partially constructed from fibre-reinforced plastic or from plastic or from aluminium or from magnesium.

10. The system according to claim 1, wherein all walls of the reinforcing element are formed from the same material.

11. The system according to claim 1, wherein the first side wall in the region of the first joint is adhesively bonded to the first panel sheet and to the second panel sheet by way of a continuous layer of adhesive, and/or wherein the second side wall in the region of the second joint is adhesively bonded to the first panel sheet and to the second panel sheet by way of a continuous layer of adhesive.

12. The system according to claim 1, wherein the first panel sheet includes a first panel wall adjacent the first joint, a second panel wall adjacent the second joint, and a third panel wall connecting the first panel wall and the second panel wall, and wherein the reinforcing element is adhesively bonded to the first panel wall and the second panel wall of the first panel sheet, and is not adhesively bonded to the third panel wall of the first panel sheet.

13. The system according to claim 12, wherein the second panel sheet also includes a first panel wall adjacent the first joint, a second panel wall adjacent the second joint, and a third panel wall connecting the first panel wall and the second panel wall, and wherein the reinforcing element is adhesively bonded to first panel wall and the second panel wall of the second panel sheet, and is not adhesively bonded to the third panel wall of the second panel sheet.

* * * * *